U. V. O'DANIEL.
AUTOMOBILE RADIATOR HEATER.
APPLICATION FILED MAR. 26, 1921.
1,391,270.
Patented Sept. 20, 1921
2 SHEETS—SHEET 1.
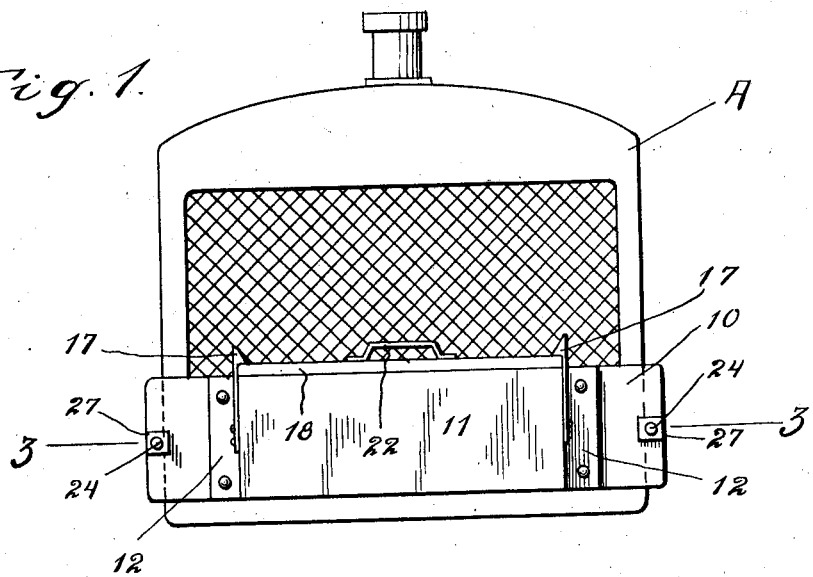
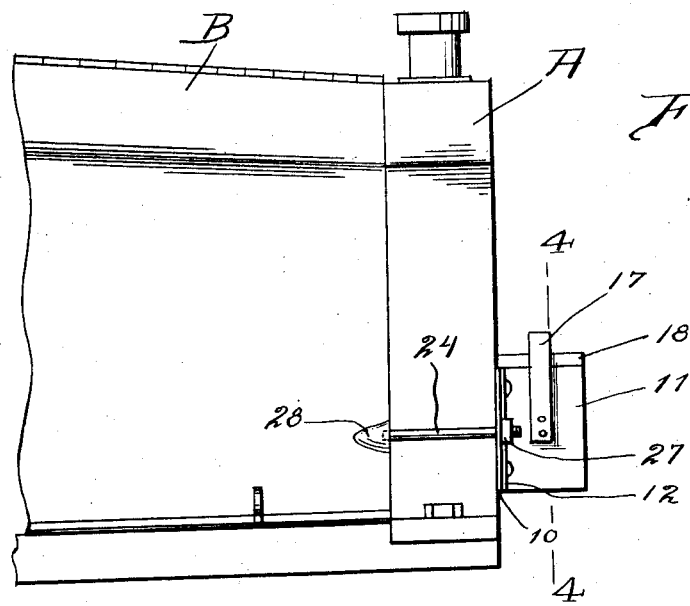
Witness
J. Milton Jester
Inventor
Uriah V. O'Daniel
by D. R. Gourick
Attorney

U. V. O'DANIEL.
AUTOMOBILE RADIATOR HEATER.
APPLICATION FILED MAR. 26, 1921.

1,391,270.  Patented Sept. 20, 1921.
2 SHEETS—SHEET 2.

Witness
J. Milton Jester

Inventor
Uriah V. O'Daniel
by A. A. Gourick
Attorney

UNITED STATES PATENT OFFICE.

URIAH V. O'DANIEL, OF GREENCASTLE, INDIANA.

AUTOMOBILE-RADIATOR HEATER.

1,391,270.      Specification of Letters Patent.    Patented Sept. 20, 1921.

Application filed March 26, 1921. Serial No. 455,918.

*To all whom it may concern:*

Be it known that I, URIAH V. O'DANIEL, a citizen of the United States, residing at Greencastle, in the county of Putnam and State of Indiana, have invented new and useful Improvements in Automobile-Radiator Heaters, of which the following is a specification.

This invention relates to automobile attachments and has for its object the provision of a heater adapted for disposition against the front of the lower portion of an automobile radiator for the purpose of heating the water in the radiator and consequently in the engine whereby to prevent freezing even in the most severe weather, the heater being so constructed and arranged as to use carbon bricks as fuel.

An important object is the provision of a device of this character which is so constructed that it may be quickly and easily clamped upon a radiator without necessitating any alteration in the construction of the radiator.

Another object is the provision of a device of this character which is of novel formation with respect to the construction of the heating casing and carbon brick holder.

An additional object is the provision of a device of this character which will be simple and inexpensive in manufacture, cheap to use, highly efficient in use, durable in service, and a general improvement in the art.

With the above and other objects and advantages in view, the invention consists in the details of construction to be hereinafter more fully described and claimed and illustrated in the accompany drawings in which—

Figure 3:
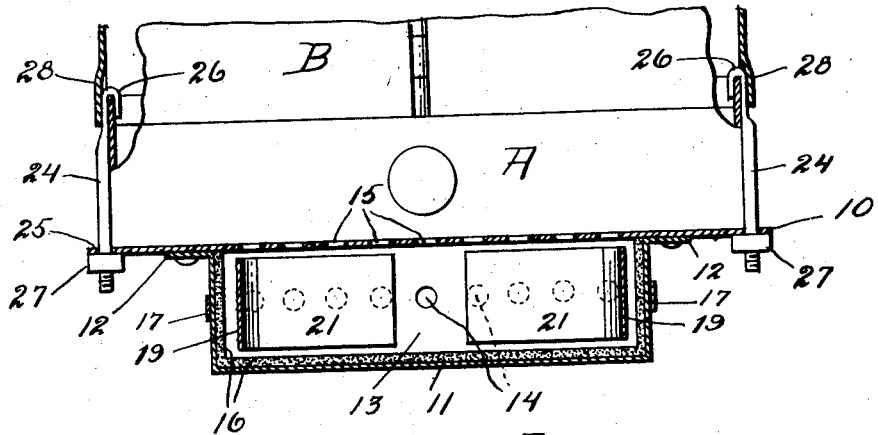
Figure 4:
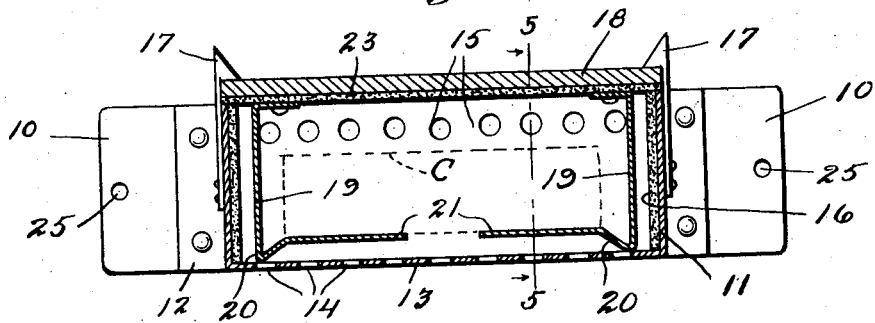
Figure 5:
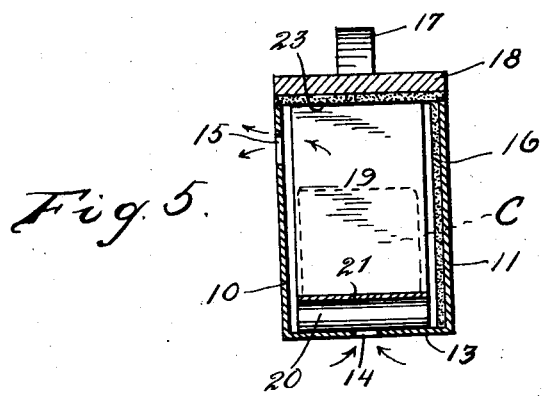

Figure 1 is a front elevation of a radiator having my device in position thereon, Fig. 2 is a side elevation, Fig. 3 is a horizontal sectional view on the line 3—3 of Fig. 1, Fig. 4 is a longitudinal sectional view taken through the heater casing, and Fig. 5 is a cross sectional view therethrough.

Referring more particularly to the drawings, the letter A designates a radiator to be heated and B designates the hood of the automobile. In carrying out my invention I provide a heating device which comprises an elongated plate 10 of greater length than the width of the radiator and secured upon this plate is a rectangular open topped and open backed casing 11 having end flanges 12 riveted or otherwise secured to the plate 10. The bottom 13 of this casing 11 is formed with a plurality of holes 14 and the plate 10 is formed within the confines of the casing with a plurality of holes 15 for the purpose of permitting heat within the casing to pass to the radiator. The inside of the casing 11 and the portion of the plate 10 within the confines of the casing are lined with asbestos 16 or other suitable heat insulating material. Secured upon the ends of the casing 11 are upwardly extending spring catches 17 for a purpose to be described.

Disposed within the casing formed as above described, is carbon brick holding means comprising a cover 18 for the casing from which depends a pair of L-shaped metal strips 19 which are offset at their angles, as shown at 20, whereby the angles will rest upon the bottom 13 of the casing while the horizontal portions 21 are disposed in slightly spaced relation above the bottom so as to provide a space into which air may pass through the draft openings 14 in the bottom 13. The carbon brick designated by letter C is disposed upon the horizontal portions 21 of these metallic strips. The cover 18 is held against displacement upon the casing 11 by the spring catches 17 and it will be apparent that these catches may be readily moved out of engagement with the cover when it is necessary to remove the brick holder for the purpose of inserting another brick. The cover 18 is provided with a suitable handle 22 and has its underside lined with asbestos 23.

In order that the device may be clamped against the radiator, I provide a pair of elongated bolts 24 passing through holes 25 in the end portions of the plate 10 and formed at one end with hooks 26 engaging behind the rear edges of the sides of the radiator and carrying nuts 27 at their threaded ends. When my device is placed in position against the radiator with the hooks engaging, as described, and the nuts 27 are tightened against the plate 10, it will be apparent that my device will be securely clamped so that it will not become displaced even when the vehicle is traveling. The forward side edges of the hood B are necessarily bulged or pressed outwardly slightly, as indicated at 28, for the accommodation of the hooked ends of the securing bolts.

From the foregoing description and a study of the drawings it is believed that the operation of the device will be thoroughly understood without further detailed explanation and it will be seen that heat generated by the combustion of the carbon brick will suffice to warm the water in the circulatory system sufficiently to prevent it from freezing. Ordinarily the use of the device is not desirable while the engine is running and the vehicle traveling but in some extremely cold climates it frequently occurs that radiators freeze even under such conditions and in such a case it is apparent that my device may be used to equal advantage while the vehicle is in operation. If found advisable or necessary a lap robe, rubber lined blanket, or the like may be thrown over the hood and radiator and also over my device so as to prevent escape of the heat.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention, I claim:

1. A radiator heater comprising an open-topped casing disposable against the front of a radiator, means for clamping the casing to the radiator, a cover for closing the top of the casing, said casing being provided with draft holes at its lower portion, and being provided in its wall toward the radiator with heat discharge openings, and a holder depending from the cover for supporting a carbon brick.

2. A radiator heater comprising an elongated casing including a base plate extending beyond the sides of the radiator with which the device is associated, heating means within said casing, and means for clamping the device against a radiator comprising elongated bolts formed at one end with hooks engaging against the rear edges of the sides of the radiator and having their other ends threaded and passing through holes in said base plate and carrying clamping nuts.

3. A device of the character described comprising an open topped casing including a base plate disposed against the front of a radiator, means carried by the base plate and engaging the radiator for clamping the device in position, said base plate being provided with holes leading to the radiator and the bottom of the casing being provided with draft holes, a cover seating upon the top of the casing and provided with a handle, catches for holding said cover against displacement, and depending metal members carried by the cover and extending to near the bottom of the casing for supporting a carbon brick.

4. A radiator heater comprising a casing having an open top, means for clamping the casing against the front of a radiator, a cover for the casing detachably secured in position, the casing being formed with draft holes and heat exit holes, and a pair of metal plates depending from the cover for supporting a carbon brick, said plates being spaced above the bottom of the casing.

In testimony whereof I hereto affix my signature.

URIAH V. O'DANIEL.